United States Patent Office 3,835,087
Patented Sept. 10, 1974

3,835,087
REFLEX-REFLECTING COMPOSITIONS CONTAINING GLASS BEADS AND NON-METALLIC FLAKE PIGMENTS
Charles E. Searight, Steven H. Brasfield, Sr., and Thomas E. McCraney, Jackson, Miss., assignors to Ferro Corp., Cleveland, Ohio
No Drawing. Continuation of abandoned application Ser. No. 138,831, Apr. 29, 1971. This application Dec. 1, 1972, Ser. No. 311,095
Int. Cl. C08g 51/28
U.S. Cl. 260—33.6 R                    6 Claims

ABSTRACT OF THE DISCLOSURE

Coating compositions which provide reflex-reflecting properties comprising (a) a binding vehicle, (b) transparent glass beads and (c) non-metallic flake pigment particles having a reflective mirror-like finish.

This is a continuation of application Ser. No. 138,831, filed Apr. 29, 1971, now abandoned.

SUMMARY OF THE INVENTION

The present invention relates to improved reflex-reflecting compositions. In general, it relates to a liquid coating composition which upon application to a surface provides reflex-reflecting properties to the surface. More particularly, it pertains to compositions containing non-metallic flake pigment particles having a reflective mirror-like finish, which particles when combined with transparent glass beads and suitable binding vehicle exhibit reflex-reflecting properties.

BACKGROUND OF THE INVENTION

Heretofore, various coating compositions have been disclosed and/or used for providing reflex-reflecting properties or characteristics to a surface, for example, a highway sign or marker. In the prior art, reflex-reflecting surfaces have been obtained by various methods and by employing various coating compositions. U.S. Pat 3,251,704, for example, discloses either directly or by incorporation by reference several prior art approaches for providing a surface which exhibits reflex-reflecting properties. One problem commonly encountered with such prior art approaches has been achieving the reflex-reflecting characteristics while at the same time retaining or providing a true color of the coated surface. For example, one commonly employed prior art method of providing a surface with reflex-reflecting properties consists of applying to a surface a coating composition comprising finely divided reflective metallic (e.g., aluminum) flake powder in combination with glass beads and a suitable binding vehicle. With such metallic flake pigment containing coating compositions, the daytime color of the coated surface tends to appear grey rather than white and the nighttime color tends to appear silver. Thus, there has existed heretofore a need for a coating composition which, when applied to a surface, would not only make the surface exhibit reflex-reflecting properties but also permit the coated surface to exhibit both true daytime color and true nighttime color.

DESCRIPTION OF THE INVENTION

We have discovered a coating composition which, when applied to a surface, provides reflex-reflecting properties and also permits the coated surface to exhibit both true daytime color and true nighttime color. The coating composition of the present invention is a normally liquid material consisting essentially of (a) a suitable binding vehicle, (b) transparent glass beads and (c) non-metallic flake pigment particles.

The non-metallic flake pigment particles employed in the compositions of the present invention have not been employed heretofore for supplying the reflecting characteristics in a reflex-reflecting composition. The non-metallic flake pigment particles suitable for use in the invention have a particle size in the range from about 2 to about 40 microns, and a thickness of about 0.3 to about 0.7 microns. The particles are chemically inert and heat resistant but are relatively fragile and care should be taken when preparing the compositions of the present invention so that the particles are not unduly shattered. These particles are also sometimes referred to as synthetic pearl pigments and comprise mica flakes with a titanium dioxide coating which manifests a reflective mirror-like finish. Such pigments are currently available in white, gold and iridescent red color, from the Mearl Corporation, New York, N.Y.

The transparent glass beads or microspheres employed in the compositions of the present invention are well known in the art and have been employed heretofore in other reflex-reflecting compositions. In order to obtain optimum reflex-reflecting characteristics, coatability, dispersion and suspension in the binding vehicle, the transparent glass beads should preferably have a refractive index of at least about 1.8, preferably about 1.9 or higher to obtain optimum reflex-reflecting characteristics, when viewed under ambient dry conditions. The transparent glass beads may be either transparent white or transparent colored, for example, yellow.

The binding vehicle employed in the compositions of the present invention is generally a varnish or varnish-like material. Such binding vehicles are known in the art and per se form no part of the present invention. Such binding vehicles generally include oil and spirit resin varnishes as well as lacquers, which provide adequately durable transparent film coatings when coated and dried. Such binding vehicles generally comprise a mixture of non-volatile film forming binding material (i.e., varnish solids) and volatile solvent material which imparts fluidity and which evaporates during drying. Alkyd resin varnishes are particularly preferred. The liquid binding vehicle also generally includes small amounts of an anti-skinning agent which agents are well known in the varnish art to prevent or minimize the formation of a surface skin upon exposure to the atmosphere. Minor amounts of other optional ingredients may also be added, for example, colloidal suspending agents may be used to assist in producing a more stable suspension of the transparent glass beads and the non-metallic flake pigment particles. Varnish dryers such as metal napthenates (e.g., cobalt, lead, and/or manganese napthenates) can also be used.

In one embodiment of the present invention, other additional pigments such as titanium dioxide coated glass beads are included in amounts up to about 10 wt. percent of the composition in order to provide additional color.

The relative amounts of the ingredients of the compositions of the present invention will, of course, vary depending upon the particular ingredients employed as well as such factors as the specific size of the transparent glass beads, etc.; but in any event suitable amounts can be readily determined by those skilled in the art in any given instance. In general, it has been found that about 1 to about 10 parts on a weight basis of non-metallic flake pigment particles for each 400 parts of glass beads results in satisfactory compositions. The bead volume concentration (bvc) is known in the art to be percent ratio of the volume of the transparent glass beads to the summation of the volume of the transparent glass beads plus the volume of the pigment plus the volume of the binding vehicle solids (on a dry basis). The compositions of the present invention will generally have a bvc value within the range of about 50 to about 90 percent.

The compositions of the present invention are prepared by first preparing a mixture of the transparent glass beads and the binding vehicle. To that mixture, the non-metallic flake pigment particles are added and stirred with a minimum of agitation. The resulting composition may be applied to a base surface by brush, knife coat, spray methods and the like. The resulting coated surface exhibits reflex-reflecting characteristics and also manifests both daytime color and nighttime color which are truer in the sense that whites look and stay white and yellows look and stay yellow, as compared for example, to prior art compositions containing metal flake pigments.

The present invention may be further understood by reference to the following illustrative example.

EXAMPLE

In this example a coating composition of the present invention is prepared having the following ingredients:

| Ingredient: | Percent by weight |
|---|---|
| Binding vehicle | 23.9 |
| Transparent glass beads (—170 mesh, 1.91 refractive index) | 64.5 |
| Non-metallic flake pigment particles | 1.6 |
| White coated beads | 9.7 |
| Metal naphthenate drier | .2 |
| Anti-skinning agent | .1 |

The above coating composition of this example is prepared by first preparing the binding vehicle by mixing about 44% polyamide modified alkyd resin ("Burnox 3540") with about 56% mineral spirits and heating, with agitation, to about 100° F. to dissolve the resin. The resulting mixture is allowed to cool to about 70° F. and upon cooling the mixture forms a gel. To the binding vehicle, the transparent glass beads, the metal naphthenate drier, the anti-skinning agent, and the white coated beads are added. The white coated beads are an optional, preferred, ingredient which adds white pigment to the coating composition without changing the essential reflex-reflecting properties of a surface coated with the composition. The white coated beads may be obtained by tumbling transparent glass beads (—170 mesh, 1.51 refractive index) in a mixing apparatus and coating with a mixture of titanium dioxide, acetone and acrylic lacquer. The non-metallic flake pigment particles are then carefully stirred into the mixture and the resulting composition is ready for use.

When the composition of the example is applied, for example, by brushing onto a surface, the coated surface shortly thereafter dries and manifests reflex-reflecting properties. Moreover, such a coated surface appears true white during both daylight and nighttime viewing.

While the present invention has been described by reference to the above specification including an illustrative example, various modifications within the spirit and scope of the invention will be apparent to those skilled in the art.

What is claimed is:

1. A coating composition which, upon application to a surface, provides reflex-reflecting properties to said surface, said composition consisting essentially of (a) a binding vehicle, (b) transparent glass beads and (c) non-metallic flake pigment particles having a reflective mirror-like finish;

said flake pigment particles comprising mica flakes having on their surface a coating of titanium dioxide;

said non-metallic flake pigment particles constituting about 1 to 10 parts on a weight basis for each 400 parts of glass beads.

2. A composition as defined by claim 1 wherein said pigment particles are essentially flat flakes having a particle size about 2 to about 40 microns and a thickness of about 0.3 to about 0.7 microns.

3. A composition as defined by claim 1 wherein said pigment particles are synthetic pearl pigments.

4. A composition as defined by claim 1 wherein said beads have a refractive index of at least about 1.9.

5. A composition as defined by claim 1 wherein said binding vehicle comprises a mixture of polyamide modified alkyd resin and mineral spirits.

6. A composition as defined by claim 1 containing as an additional ingredient up to about 10 wt. percent of an additional pigment comprising titanium dioxide coated glass beads.

References Cited

UNITED STATES PATENTS

| 3,251,404 | 4/1966 | Nellessen | 106—193 |
| 3,475,191 | 10/1969 | Lodge et al. | 106—288 |
| 3,087,828 | 4/1963 | Linton | 106—291 |
| 3,036,928 | 4/1962 | Poole | 117—33 |
| 2,933,989 | 4/1960 | Adrian | 94—1.5 |
| 3,288,618 | 11/1966 | De Vries | 106—148 |

ALLAN LIEBERMAN, Primary Examiner

R. ZAITLEN, Assistant Examiner

U.S. Cl. X.R.

106—19, 91, 291; 260—41 A